P. F. WELLS.
Assignor of one-half to R. S. WELLS.
SPRING TOOTH.
No. 10,972. Reissued Dec. 4, 1888.
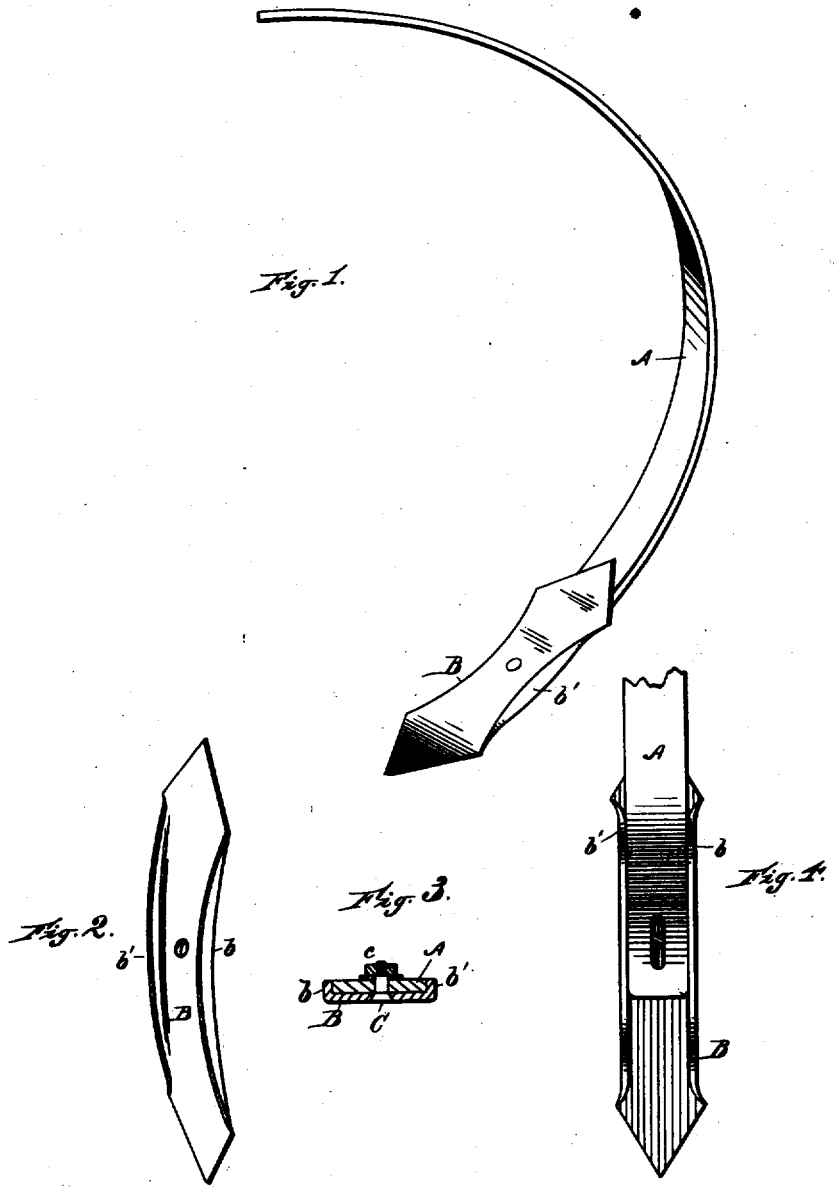
WITNESSES.
John E. Wiles.
M. B. O'Doherty.
INVENTOR.
Philip F. Wells.
By W. W. Seggett.
Attorney.
N. PETERS, Photo-Lithographer, Washington, D. C.

UNITED STATES PATENT OFFICE.

PHILIP F. WELLS, OF MILFORD, MICHIGAN, ASSIGNOR OF ONE-HALF TO R. S. WELLS, OF SAME PLACE.

SPRING-TOOTH.

SPECIFICATION forming part of Reissued Letters Patent No. 10,972, dated December 4, 1888.

Original No. 382,847, dated May 15, 1888. Application for reissue filed October 31, 1888. Serial No. 289,689.

*To all whom it may concern:*

Be it known that I, PHILIP F. WELLS, a citizen of the United States, residing at Milford, county of Oakland, State of Michigan, have invented a certain new and useful Improvement in Spring-Teeth; and I declare the following to be a full, clear, and exact description of the invention, such as will enable others skilled in the art to which it appertains to make and use the same, reference being had to the accompanying drawings, which form a part of this specification.

My invention relates to certain new and useful improvements in a spring-tooth for harrows, &c.; and it consists, essentially, of the construction and combination of devices hereinafter specified, and more particularly set forth in the claims.

In the drawings, Figure 1 is a view in perspective embodying my invention. Fig. 2 is a separate view of the tooth. Fig. 3 is a cross-section of the spring with point attached thereto. Fig. 4 is a rear view.

I carry out my invention as follows, it having reference particularly to that class of teeth where a spring-arm is provided with an auxiliary point: Accordingly, A represents a spring-arm or body of a spring-tooth. This may be of ordinary construction and perforated to constitute a bolt-orifice, and, preferably, by a longitudinal vertical slot to receive the bolt by which the point is engaged therewith, the arm itself being made of a band of spring metal of suitable thickness.

B is a metallic point, preferably pointed at each end, so as to be reversible upon the lower end of the spring bar or arm. Midway of its extremities it is also perforated to receive the attaching-bolt C, whereby it is firmly held upon the spring-arm, the bolt being provided with a nut, *c*. The slot in the spring-arm being a longitudinal one, as described, the point may be readily adjusted as desired, while it is also readily detachable from the arm whenever required.

My present invention, however, contemplates more particularly the construction of the point with flanges *b b'* on its edges, the said edges being turned rearward from the face of the point, as shown, so as to engage over the edges of the spring-arm and have extended bearings along said edges. These flanges are constructed thus to fit over the edges of the spring-arm in such a manner as to effectually prevent the point from turning on said spring when only a single engaging-bolt C is employed. One bolt is thus amply sufficient, and the point is firmly held tight and immovable in place by means of the single bolt and the flanges of the point lapping or extending over the edges of the spring-arm. It is obviously impossible thus for the point to turn upon the bolt when the nut has been tightened thereon. It is evident, also, that the flanging of the point thus serves to give added stiffness thereto, while it may also be readily reversed.

What I claim is—

1. The herein-described spring-tooth, consisting, essentially, of the curved-spring standard provided with a bolt-orifice near its lower end, the reversible point having its edges turned abruptly rearwardly to snugly engage the opposite edges of the spring-standard and having an extended bearing therewith in the direction of the length of the point, and the single draw-bolt extending through the bolt-orifice to lock the point to the spring-standard, substantially as set forth.

2. The herein-described spring-tooth, consisting, essentially, of the curved-spring standard provided with a slot near its lower end, the reversible point having its edges turned abruptly rearwardly to snugly engage the opposite edges of the spring-standard and having an extended bearing therewith in the direction of the length of the point, and the single draw-bolt extending through the elongated slot to lock the point to the spring-standard, substantially as set forth.

In testimony whereof I sign this specification in the presence of two witnesses.

PHILIP F. WELLS. [L. S.]

Witnesses:

JAMES H. PADLEY,

WALTER CRAWFORD.